(12) United States Patent
Offermann et al.

(10) Patent No.: US 9,596,719 B2
(45) Date of Patent: Mar. 14, 2017

(54) COMPOSITE PANE HAVING AN ELECTRICALLY HEATABLE COATING

(75) Inventors: Volkmar Offermann, Eschweiler (DE); Andreas Schlarb, Herzogenrath (DE); Martin Melcher, Herzogenrath (DE); Susanne Lisinski, Köln (DE)

(73) Assignee: Saint-Gobain Glass France, Courbevoie (FR)

( * ) Notice: Subject to any disclaimer, the term of this patent is extended or adjusted under 35 U.S.C. 154(b) by 670 days.

(21) Appl. No.: 13/704,985

(22) PCT Filed: Jul. 6, 2011

(86) PCT No.: PCT/EP2011/061351
§ 371 (c)(1),
(2), (4) Date: Dec. 17, 2012

(87) PCT Pub. No.: WO2012/004280
PCT Pub. Date: Jan. 12, 2012

(65) Prior Publication Data
US 2013/0092676 A1    Apr. 18, 2013

(30) Foreign Application Priority Data
Jul. 7, 2010   (EP) ..................................... 10168773

(51) Int. Cl.
*H05B 3/84*   (2006.01)
*H05B 3/86*   (2006.01)
(Continued)

(52) U.S. Cl.
CPC ......... *H05B 3/86* (2013.01); *B32B 17/10036* (2013.01); *B32B 17/10192* (2013.01);
(Continued)

(58) Field of Classification Search
CPC .. B32B 17/00; H05B 3/00; H05B 3/84; H05B 3/86
(Continued)

(56) References Cited

U.S. PATENT DOCUMENTS

| 2,321,587 A | 6/1943 | Davie et al. |
| 4,323,726 A | 4/1982 | Criss et al. |

(Continued)

FOREIGN PATENT DOCUMENTS

| DE | 9313394 U1 | 10/1993 |
| DE | 4235063 A1 | 4/1994 |

(Continued)

OTHER PUBLICATIONS

International Preliminary Report on Patentability for PCT Application PCT/EP2011/061350 filed on Jul. 6, 2011. Mail date: Jan. 8, 2013 (English Version).
(Continued)

*Primary Examiner* — Michael Laflame, Jr.
(74) *Attorney, Agent, or Firm* — Steinfl+Bruno LLP

(57) ABSTRACT

A composite pane having an electrically heatable coating is described. The composite pane comprises: at least two individual panes; an intermediate layer, which connects the individual panes to one another; at least one transparent, electrically conductive coating on at least one side of at least one of the at least two individual panes, the at least one side faces the intermediate layer; and at least two bus bars, which are connected to the at least one transparent, electrically conductive coating, wherein a first bus bar is electrically connected to a first feed line provided for connection to one pole of a voltage source and a second bus bar is electrically connected to a second feed line provided for connection to the second pole of the voltage source.

20 Claims, 6 Drawing Sheets

Figure 1:
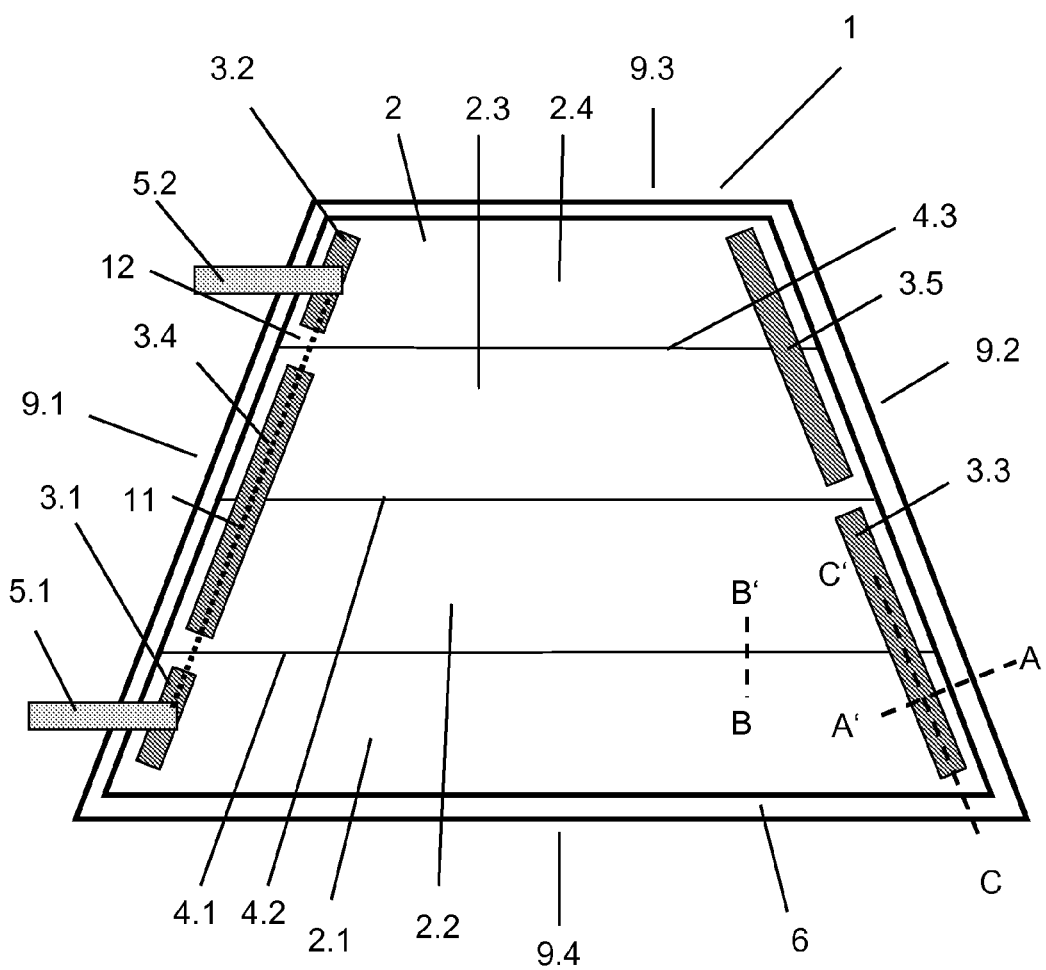

(51) Int. Cl.
*B32B 17/00* (2006.01)
*B32B 17/10* (2006.01)
*B60S 1/02* (2006.01)

(52) U.S. Cl.
CPC ........ *B60S 1/026* (2013.01); *H05B 2203/013* (2013.01); *H05B 2203/016* (2013.01)

(58) Field of Classification Search
USPC .................... 219/202, 203, 522, 543–547
See application file for complete search history.

(56) References Cited

U.S. PATENT DOCUMENTS

| | | | |
|---|---|---|---|
| 4,708,888 | A | 11/1987 | Mitchell et al. |
| 4,994,650 | A | 2/1991 | Koontz |
| 5,187,349 | A * | 2/1993 | Curhan et al. ................ 219/202 |
| 5,798,499 | A * | 8/1998 | Shibata et al. ................ 219/203 |
| 5,824,994 | A * | 10/1998 | Noda et al. .................... 219/203 |
| 6,204,480 | B1 | 3/2001 | Woodard et al. |
| 6,211,491 | B1 | 4/2001 | Mazaki |
| 6,675,873 | B2 * | 1/2004 | Ieda et al. ........................ 165/43 |
| 6,838,181 | B1 | 1/2005 | Degand |
| 7,019,260 | B1 * | 3/2006 | Degand ............. B32B 17/10036 219/203 |
| 7,335,421 | B2 * | 2/2008 | Thiel ................. B32B 17/10036 428/428 |
| 2002/0045037 | A1 | 4/2002 | Boire et al. |
| 2003/0019860 | A1 * | 1/2003 | Sol ................................ 219/203 |
| 2003/0106883 | A1 * | 6/2003 | Sangwan et al. ............. 219/203 |
| 2004/0065651 | A1 | 4/2004 | Voeltzel |
| 2004/0069340 | A1 | 4/2004 | Luch |
| 2004/0149734 | A1 | 8/2004 | Petrenko et al. |
| 2005/0056638 | A1 * | 3/2005 | Maeuser ....................... 219/543 |
| 2005/0089691 | A1 * | 4/2005 | Noguchi et al. .............. 428/426 |
| 2006/0081581 | A1 | 4/2006 | Odeh |
| 2006/0102613 | A1 * | 5/2006 | Kuibira et al. ............ 219/444.1 |
| 2006/0186105 | A1 * | 8/2006 | Voeltzel ............ B32B 17/10036 219/203 |
| 2007/0045282 | A1 | 3/2007 | Petrenko |
| 2007/0108175 | A1 | 5/2007 | Andrt |
| 2007/0259137 | A1 * | 11/2007 | Busick et al. ................... 428/34 |
| 2009/0206068 | A1 * | 8/2009 | Ishizeki et al. ............... 219/203 |
| 2010/0090597 | A1 | 4/2010 | Werners et al. |
| 2010/0091510 | A1 | 4/2010 | Nyderle et al. |

FOREIGN PATENT DOCUMENTS

| | | |
|---|---|---|
| DE | 19860870 A1 | 7/2000 |
| DE | 1033618 B3 | 3/2005 |
| DE | 10352464 A1 | 6/2005 |
| DE | 102004029164 A1 | 12/2005 |
| DE | 20 2004 019 286 U1 | 4/2006 |
| DE | 69731268 T2 | 9/2006 |
| DE | 102008018147 A1 | 10/2009 |
| DE | 102008029986 A1 | 1/2010 |
| DE | 20 2008 017611 U1 | 4/2010 |
| EP | 0025755 B1 | 3/1981 |
| EP | 0847965 B1 | 6/1998 |
| EP | 1450376 A1 | 8/2004 |
| EP | 2139049 A1 | 12/2009 |
| EP | 2200097 A1 | 6/2010 |
| WO | 02/85074 A1 | 10/2002 |
| WO | 03/105533 A1 | 12/2003 |
| WO | 2004103926 A1 | 12/2004 |
| WO | WO 2005011052 A2 | 2/2005 |
| WO | 2006/010698 A1 | 2/2006 |

OTHER PUBLICATIONS

Written Opinion of the International Searching Authority for PCT Application PCT/EP2011/061350 filed on Jul. 6, 2011. Mail date: Jan. 8, 2013 (English Version).

International Preliminary Report on Patentability for PCT Application PCT/EP2011/061351 filed on Jul. 6, 2011. Mail date: Jan. 8, 2013 (English Version).

Written Opinion of the International Searching Authority for PCT Application PCT/EP2011/061351 filed on Jul. 6, 2011. Mail date: Jan. 8, 2013 (English Version).

International Search Report for PCT Application PCT/EP2011/061350 filed Jul. 6, 2011. Mail date: Nov. 7, 2011.

International Search Report for PCT Application PCT/EP2011/061351 filed Jul. 6, 2011. Mail date: Oct. 28, 2011.

Restriction Requirement for U.S. Appl. No. 13/704,982, filed Apr. 8, 2013 on behalf of Susanne Lisinski. Mail Date: Oct. 30, 2015. 6 pages.

Non-Final Office Action for U.S. Appl. No. 13/704,982, filed Apr. 8, 2013 on behalf of Susanne Lisinski. Mail Date: Dec. 18, 2015. 30 pages.

* cited by examiner

B-B'

C-C'

COMPOSITE PANE HAVING AN ELECTRICALLY HEATABLE COATING

CROSS REFERENCE TO RELATED APPLICATIONS

The present application is the US national stage of International Application PCT/EP2011/061351 filed on Jul. 6, 2011, which, in turn, claims priority to European Patent Application EP 10168773.9 filed on Jul. 7, 2010.

The invention relates to a composite pane with an electrically heatable coating, in particular, an electrically heatable motor vehicle pane. The invention further relates to the use of the composite pane according to the invention as a motor vehicle pane, in particular, as a motor vehicle pane for electric vehicles.

The term "electric vehicles" refers to motor vehicles that are driven by electrical energy. The driving energy is, for the most part, carried along in the motor vehicle in the form of chargeable accumulators and rechargeable batteries or generated in the motor vehicle itself by fuel cells. An electric motor converts the electrical energy into mechanical energy for locomotion. The on-board voltage of electric vehicles is typically from 100 V to 400 V.

Because of the limited energy storage density of accumulators or rechargeable batteries, the driving range of electric vehicles is quite limited. Consequently, the efficient use of electrical energy is of particular significance with electric vehicles.

The same requirements are imposed on the glazing of electric vehicles as on the glazing of motor vehicles with internal combustion engines. The following legal regulations apply with regard to the size of the field of vision and the structural stability of the panes:

ECE R 43: "Uniform Provisions concerning the Approval of Safety Glazing and Composite Glass Materials" as well as Technical Requirements for Vehicle Components in the Design Approval Test §22 a StVZO [German Regulation Authorizing the Use of Vehicles for Road Traffic], No. 29 "Safety Glass".

These regulations are fulfilled, as a rule, by composite glass panes. Composite glass panes consist of two or more individual panes, in particular, made of float glass, and are fixedly bonded with heat and pressure to one another by one or a plurality of intermediate layers. The intermediate layers are, for the most part, made of thermoplastics uch as polyvinyl butyral (PVB) or ethylene vinyl acetate (EVA).

The field of vision of a motor vehicle pane must be kept free of ice and condensation. In the case of motor vehicles with internal combustion engines, engine heat is, as a rule, used to heat a stream of air. The warm stream of air is then directed to the panes. This method is unsuitable for electric vehicles since electric vehicles do not have engine heat. The generation of warm air from electrical energy is not very efficient.

Alternatively, the pane can have an electrical heating function. DE 103 52 464 A1 discloses a composite glazing with two glass panes. Wires running parallel to each other are inserted between the glass panes. When a voltage is applied to the wires, an electrical current flows. The glass pane is heated by the development of Joule heat due to current flow resistance. Because of design and safety aspects, the number of wires in the glass as well as the diameter of the wires must be kept as small as possible. The wires must not be visible or must be hardly perceptible in daylight and at night with headlight illumination.

More suitable are transparent, electrically conductive coatings, as are known from DE 103 33 618 B3. There, a glass pane has an electrically heatable silver layer. Coatings based on thin silver layers can be produced cost-effectively and are resistant to aging. The layers have, as a rule, sheet resistances in the range of 1 ohm/square to 5 ohm/square. The total resistance of a motor vehicle windshield for operation with a voltage of 42 V is, depending on the position of the electrical connections and heating output, roughly 2 Ohm to 4 Ohm. Coatings with resistances in this range are not suitable for on-board voltages of more than 100 V. The reduction of operating voltages of more than 100 V to 42 V or 14 V, for example, by a power adapter, is very inefficient in terms of energy.

The resistance of the transparent, electrically conductive coating must be selected such that the composite pane is not damaged by overheating. Moreover, there must be no risk of burns upon contact of the heated glass pane with bare skin. The coating must, in particular, be dimensioned such that after a period of 30 min. with operating voltage applied, no point of the composite pane has a temperature>75° C.

The object of the present invention consists in providing a composite pane with a transparent, electrically conductive coating that is suitable for an operating voltage of 100 V to 400 V and has a heating output of 300 W/m$^2$ to 1000 W/m$^2$. The heatable coating should be economically producible and resistant to aging.

The object of the present invention is accomplished according to the invention by means of a composite pane with an electrically heatable coating in accordance with claim 1.

Preferred embodiments emerge from the subclaims. A use of the composite pane emerges from further claims.

The composite pane according to the invention contains at least two panes, which are bonded to one another by at least one intermediate layer. In principle, all transparent, electrically insulating substrates that are thermally and chemically stable as well as dimensionally stable under the conditions of the production and use of the composite pane according to the invention are suitable as panes.

The panes contain preferably glass, particularly preferably flat glass, float glass, quartz glass, borosilicate glass, soda-lime glass, or clear plastics, preferably rigid clear plastics, in particular, polyethylene, polypropylene, polycarbonate, polymethyl methacrylate, polystyrene, polyamide, polyester, polyvinyl chloride, and/or mixtures thereof. Examples of suitable types of glass are known from the German translation of European Patent EP 0 847 965 B1 with the file number DE 697 31 268 T2, page 8, paragraph [0053]. In a preferred embodiment of the composite pane according to the invention, at least one of the panes contains glass and at least one of the panes contains plastic. In particular, with a use according to the invention as a motor vehicle pane, the outer pane contains glass and the inner pane contains plastic.

The thickness of the panes can vary broadly and, thus, be eminently adapted to the requirements of the individual case. Preferably, panes with the standard thicknesses of 1.0 mm to 25 mm and, more preferably, of 1.4 mm to 2.1 mm are used. The size of the panes can vary broadly and is based on the size of the application according to the invention. The panes can have any three-dimensional shape. Preferably, the three-dimensional shape has no shadow zones such that it can, for example, be coated by cathode sputtering. Preferably, the substrates are planar or slightly or greatly curved in one direction or in multiple spatial directions. In particular, planar substrates are used. The panes can be colorless or tinted.

The panes are bonded to one another by intermediate layers. The intermediate layers contain, preferably, thermoplastics, such as polyvinyl butyral (PVB), ethylene vinyl acetate (EVA), polyurethane (PU), polyethylene terephthalate (PET), or a plurality of layers thereof, preferably with thicknesses of 0.3 mm to 0.9 mm.

At least one of the individual panes of the composite pane according to the invention is coated on one inner side with a transparent, electrically conductive coating. Here, "inner side" means any side facing an intermediate layer. The transparent, electrically conductive coating according to the invention is transparent to electromagnetic radiation, preferably electromagnetic radiation of a wavelength of 300 to 1.300 nm, in particular, to visible light. "Transparent means that the total transmission of the composite pane complies with the legal regulations, and, in particular, is, for visible light, preferably, >70% and, in particular, >80%. Such coatings are known from DE 20 2008 017 611 U1 and EP 0 847 965 B1. They are made, as a rule, from a metal layer such as a silver layer or silver-containing metal alloy that is embedded between at least two layers made of a dielectric material of the metal oxide type. The metal oxide contains, preferably, zinc oxide, tin oxide, indium oxide, titanium oxide, silicon oxide, aluminum oxide, or the like, as well as combinations of one or a plurality thereof. The dielectric material can also contain nitride, silicone carbide, or aluminum nitride.

Preferably, metal layer systems with a plurality of metal layers are used, wherein the individual metal layers are separated by at least one layer made of dielectric material. This layer structure is, generally, obtained by a sequence of deposition processes that are performed by a vacuum method such as magnetic field-assisted cathode sputtering. Very fine metal layers, which contain, in particular, titanium or niobium, can be provided on both sides of the silver layer. The lower metal layer serves as a bonding and crystallization layer. The upper metal layer serves as a protective and getter layer to prevent a change in the silver during the further process steps.

The thickness of the transparent, electrically conductive coating can vary broadly and be adapted to the requirements of individual case. It is essential that the thickness of the electrically conductive, transparent coating must not be so great that it becomes impermeable to electromagnetic radiation, preferably electromagnetic radiation of a wavelength of 300 to 1.300 nm and, in particular, visible light. The silver layer systems used according to the invention have a sheet resistance of 1 ohm/square to 10 ohm/square, preferably of 3 ohm/square to 5 ohm/square.

In an advantageous embodiment of the composite pane according to the invention, at least one transparent electrically conductive layer is situated on at least one of the inner sides of the panes. Here, "inner side" of the pane means any side facing the thermoplastic intermediate layer. In the case of a composite pane made of two panes, a transparent, electrically conductive layer can be situated on the inner side of one pane or the other. Alternatively, a transparent, electrically conductive layer can also be situated, in each case, on each of the two inner sides. In the case of a composite pane made of more than two panes, a plurality of transparent, electrically conductive layers can even be situated on a plurality of inner sides of the panes. Alternatively, one transparent, electrically conductive coating can be embedded between two thermoplastic intermediate layers. Then, the transparent, electrically conductive coating is preferably applied on a carrier film or carrier pane. The carrier film or carrier pane contains, preferably, a polymer, in particular, polyvinyl butyral (PVB), ethylene vinyl acetate (EVA), polyurethane (PU), polyethylene terephthalate (PET), or combinations thereof.

The transparent, electrically conductive coating is connected to, in particular, strip- or band-shaped collecting conductors, so-called "bus bars", for the transmission of electrical power. Examples of suitable bus bars are known from DE 103 33 618 B3 and EP 0 025 755 B1. The bus bars serve for the broadly distributed introduction of the heating current into the coating. The bus bars are produced by printing of a conductive paste that is baked in before the bending and/or at the time of the bending of the glass pane. The conductive paste preferably contains silver particles and glass frits. The layer thickness of the baked-in silver paste is, in particular, from 5 μm to 20 μm.

In an alternative embodiment of the bus bars according to the invention, thin and narrow metal foil strips or metal wires, that preferably contain copper and/or aluminum, are used as bus bars; in particular, copper foil strips with a thickness of 50 μm are used. The width of the copper foil strips is, preferably, 1 mm to 10 mm. The metal foil strips or metal wires are placed on the coating at the time of the assembly of the composite layers. In the subsequent autoclave process, a secure electrical contact between the bus bars and the coating is obtained through the action of heat and pressure. The electrical contact between the coating and bus bars can, however, also be produced by soldering or gluing with an electrically conductive adhesive.

The composite pane according to the invention includes, in particular, at least two bus bars, which are connected to the transparent, electrically conductive coating, wherein a first bus bar is electrically connected to a first feed line provided for connection to one pole of a voltage source and a second bus bar is electrically connected to a second feed line provided for connection to the other pole of the voltage source. Moreover, the composite pane can include additional bus bars without a feed line.

In the automotive sector, foil conductors are customarily used as feed lines for contacting bus bars in the interior of composite panes. Examples of foil conductors are described in DE 42 35 063 A1, DE 20 2004 019 286 U1, and DE 93 13 394 U1. Flexible foil conductors, sometimes also called "flat conductors" or "flat-band conductors", are preferably made of a tinned copper strip with a thickness of 0.03 mm to 0.1 mm and a width of 2 mm to 16 mm. Copper has proved successful for such conductor tracks, since it has good electrical conductivity as well as good processability into foils. At the same time, material costs are low. Other electrically conductive materials that can be processed into foils can also be used. Examples for this are gold, silver, or tin and alloys thereof. For electrical isolation and for stabilization, the tinned copper strip is applied to a carrier material made of plastic or laminated therewith on both sides. The insulation material contains, as a rule, a 0.025 mm to 0.05 mm thick polyimide-based film. Other plastics or materials with the required insulating properties can also be used. A plurality of conductive layers electrically isolated from each other can be situated in one foil conductor strip. Foil conductors that are suitable for contacting electrically conductive layers in composite panes have a total thickness of only 0.3 mm. Such thin foil conductors can be embedded without difficulty in the thermoplastic adhesive layer between the individual glass panes. Alternatively, thin metal wires can also be used as feed lines. The metal wires contain, in particular, copper, tungsten, gold, silver, or aluminum or alloys of at least two of these metals. The alloys can also contain molybdenum, rhenium, osmium, iridium, palladium, or platinum. The feed lines are guided out of the composite pane and are preferably connected via control electronics to the voltage source providing the operating voltage.

The transparent, electrically conductive coating according to the invention has incisions that separate the coating into regions at least partially electrically isolated from one another. The incisions can separate the coating, in particular, into regions completely electrically isolated from one another. The regions completely electrically isolated from one another are electrically connected to one another serially (in series) by bus bars without a feed line or in parallel. Alternatively, or in combination with this, the incisions can divide the coating only partially such that the coating regions are continuous. This results in the fact that the current flows meanderingly through the coating. This lengthens the path of the current through the coating and increases the total resistance of the coating.

In the composite pane according to the invention, the incisions are disposed and implemented such that the coating has an electrical resistance such that, with an operating voltage in the range of more than 100 V to 400 V, a heating output of 300 W/m² to 1000 W/m² can be generated. The exact number, position, and length of the incisions for achieving a desired total resistance can be ascertained by simple experiments or simulations. The, in particular, linear incisions are preferably designed such that the view through the composite pane is only slightly or not at all impaired and the most homogeneous distribution possible of the heating output results. For this purpose, the incisions have the least possible width (dimension perpendicular to the length).

In a first approximation, the length of the current path 1 results from:

$$l = \sqrt{\frac{U^2}{P_{spez} \cdot R_{Quadrat}}}$$

where U is the operating voltage, $P_{spez}$ is the specific heating output and $R_{Quadrat}$ is the sheet resistance of the transparent, electrically conductive coating. The quotient of the length of the current path 1 and the width of the pane d yields, by way of approximation, the number of coating regions electrically isolated from one another connected in series. Based on the resistance measured, it is possible to adjust the desired total resistance by simple geometric modifications.

The incisions in the transparent, electrically conductive coating are preferably made using a laser. Methods for structuring thin metal foils are known, for example, from EP 2 200 097 A1 or EP 2 139 049 A1. Alternatively, the incisions can be made by mechanical ablation as well as by chemical or physical etching. The width of the incisions must be adapted to the voltage to be insulated against and is, preferably, 10 μm to 500 μm, in particular, 50 μm to 100 μm, for example, 80 μm, or 30 μm to 50 μm. However, it is also conceivable for the width to be less than 30 μm. With small widths of less than 80 μm, in particular, less than 50 μm, it is possible, in a particularly advantageous manner, to avoid slight yellowing of the composite pane perceptible in particular with silver-containing bus bars. Such yellowing is perceptible especially in reflexion.

Here, it is essential that a coating section of the electrically conductive coating situated in the region of a shortest geometric distance between the first bus bar and the second bus bar (i.e., those bus bars that are connected to the feed lines and thus have the greatest difference in potential) is electrically interrupted by a plurality of such incisions, wherein the number of the incisions is selected depending on the magnitude of the operating voltage provided such that a voltage drop over an individual incision by which two adjacent coating regions are electrically separated from one another is less than a breakdown voltage of the incision. By means of this measure, it can be advantageously achieved that the width of the incisions can be relatively small without there being the risk of a disruptive breakdown when the high operating voltage is applied. If the complete operating voltage were to drop over an individual incision, the result would be that the incision would have to be implemented correspondingly wide in order to obtain an adequately high breakdown voltage, with the consequence, however, with the conventional materials, that the optically aesthetic appearance of the composite pane would be disadvantageously impaired. In contrast to this, the composite pane according to the invention enables a significant reduction in the width of the incisions, since, in each case, only part of the operating voltage drops between the coating regions adjacent one another. Advantageously, the incisions have, in each case, such a (small) width that the operating voltage envisaged is greater than their electrical breakdown voltage, such that without the measure according to invention, a breakdown of the incisions is likely. With the composite pane according to the invention, because of the small layer thickness of the conductive coating, not only can a sudden (abrupt) electrical breakdown occur on the incisions but also an electrical breakdown can occur as a result of electromigration when high operating voltages are applied. This is the effect that atoms of the coating can migrate into the electrically isolating gap due to the voltage applied, as a result of which, ultimately, during the course of a process that lasts, for example, a month or year, a (creeping) electrical breakdown can occur. According to the invention, this effect is also to be included.

The composite pane according to the invention thus offers, on the one hand, the advantage that by means of the incisions, the resistance of the coating can be adjusted such that with a high operating voltage in the range of more than 100 V to 400 V, a suitable heating output in the range of 300 W/m² to 1000 W/m² can be achieved. On the other hand, the incisions can be disposed such that at least two incisions are in a direct line (connection) between the bus bars impinged upon by the operating voltage such that a breakdown of the incisions with the high operating voltage can be reliably avoided, with the result that the incisions can have a relatively small width and not interfere with the optically aesthetic appearance of the composite pane. The composite pane according to the invention thus enables, for the first time, generating heating outputs suitable for practical application with the high operating voltages of electric vehicles, without, at the same time, disadvantageously impairing the optically aesthetic appearance. Preferably, the composite pane according to the invention is designed for use with operating voltages in the range of 280 V to 400 V.

In a preferred embodiment of the composite pane according to the invention, the transparent, electrically conductive coating extends over at least 90% of the surface area of the side of the pane on which it is applied. The transparent, electrically conductive coating extends, preferably, over the entire surface area of the side of the pane on which it is applied, minus a circumferential frame-like decoated region with a width of 2 mm to 20 mm, preferably of 5 mm to 10 mm. This serves for electrical isolation between the voltage-carrying coating and the motor vehicle body. The decoated region is preferably hermetically sealed as a vapor diffusion barrier by the intermediate layer or an acrylate adhesive. The corrosion-sensitive coating is protected against moisture and atmospheric oxygen by the vapor diffusion barrier. In addition, the transparent, electrically conductive coating can be decoated in another region that serves as a data transmission window or communication window.

In an advantageous embodiment of the composite pane according to the invention, the incisions are implemented such that they separate the transparent, electrically conductive coating into at least three regions (completely) isolated electrically from one another. Adjacent coating regions are, in each case, electrically connected to one another via a third bus bar (i.e., bus bar without feed line). The separation of the regions and their connection via the bus bars yields a lengthening of the path of the current through the transparent, electrically conductive coating. The lengthening of the path of the current results in an increase in the electrical resistance that can be adjusted in a suitable manner to obtain the desired heating output.

In another advantageous embodiment of the composite pane according to the invention, the bus bars are implemented on the edges of the composite pane that are vertical in the installed position. The bus bars run, in particular, parallel to the so-called A-pillars (A-posts) of the motor vehicle body.

In an advantageous embodiment of the composite pane according to the invention, the bus bars that are connected to the feed lines are disposed on the edge of one side of the composite pane. The operating voltage is applied to the transparent, electrically conductive coating via the feed lines. In a preferred embodiment, the bus bars that are connected to the feed lines are situated directly adjacent the edge of one side of the composite pane. In an alternative preferred embodiment, the feed lines are guided together into the interior of the composite pane according to the invention and preferably guided out of the composite pane near each other. The electrical connections of the composite pane can be connected to the motor vehicle electrical system via a plug element or a two-wire line. Making contact by means of a plug element simplifies the installation of the composite pane in the motor vehicle body.

The invention further extends to an arrangement that includes a composite pane as described above as well as a voltage source for providing the operating voltage.

The invention further includes the use of the composite pane according to the invention in means of transportation for travel on land, in the air, or on water, in particular, in motor vehicles, for example, as a windshield, rear window, side windows, and/or roof glass. The composite pane according to the invention is preferably used as a motor vehicle pane in means of transportation with an on-board voltage of 100 V to 400 V. The composite pane according to the invention is also preferably used as a motor vehicle pane in motor vehicles that are driven by conversion of electrical energy, in particular, in electric vehicles. The electrical energy is drawn from accumulators, rechargeable batteries, fuel cells, or internal combustion engine-driven generators. The composite pane according to the invention is further used as a motor vehicle pane in hybrid electric vehicles that are driven, in addition to the conversion of electrical energy, by conversion of another energy form. The other energy form is preferably an internal combustion engine, in particular, a diesel engine.

It is understood that the characteristics mentioned above and to be explained in the following can be used not only in the combinations indicated but also in other combinations or by themselves without departing from the scope of the present invention.

Figure 2:
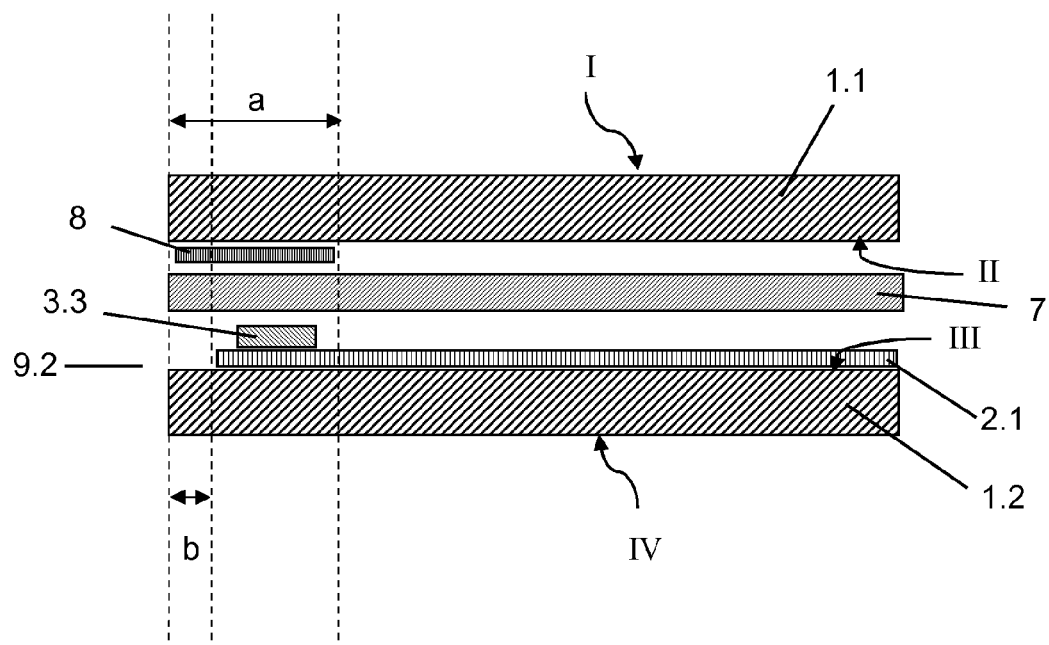
Figure 3:
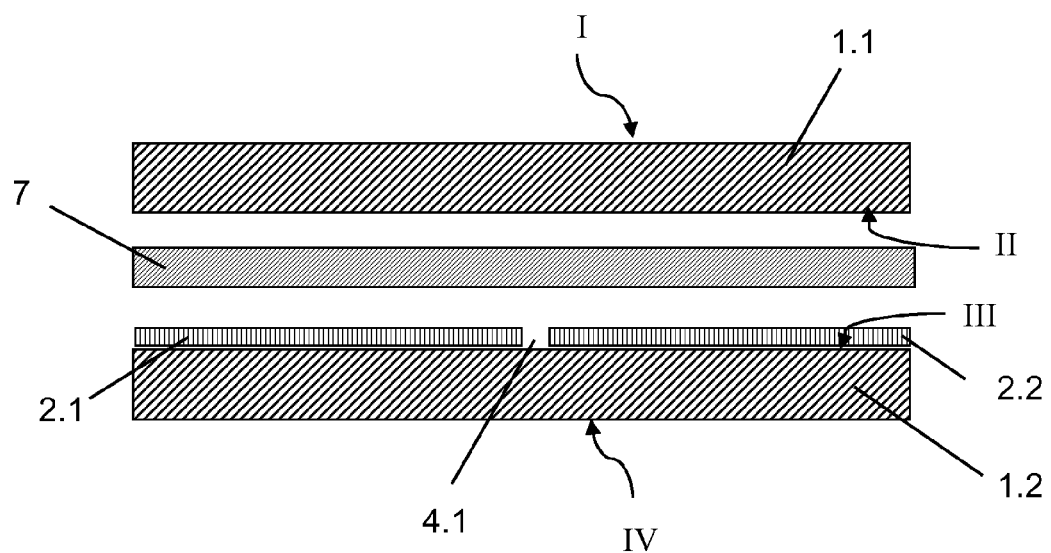
Figure 4:
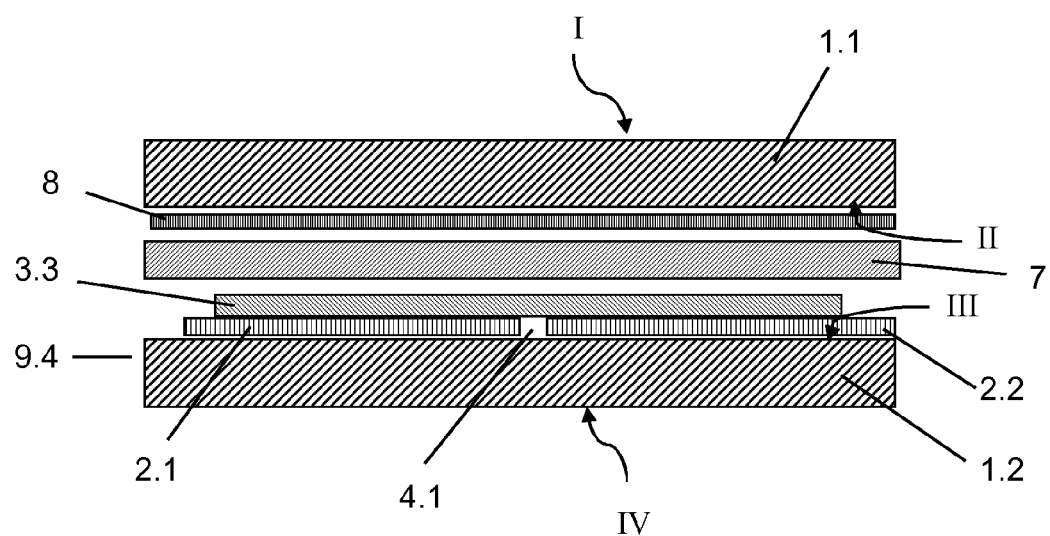
Figure 5:
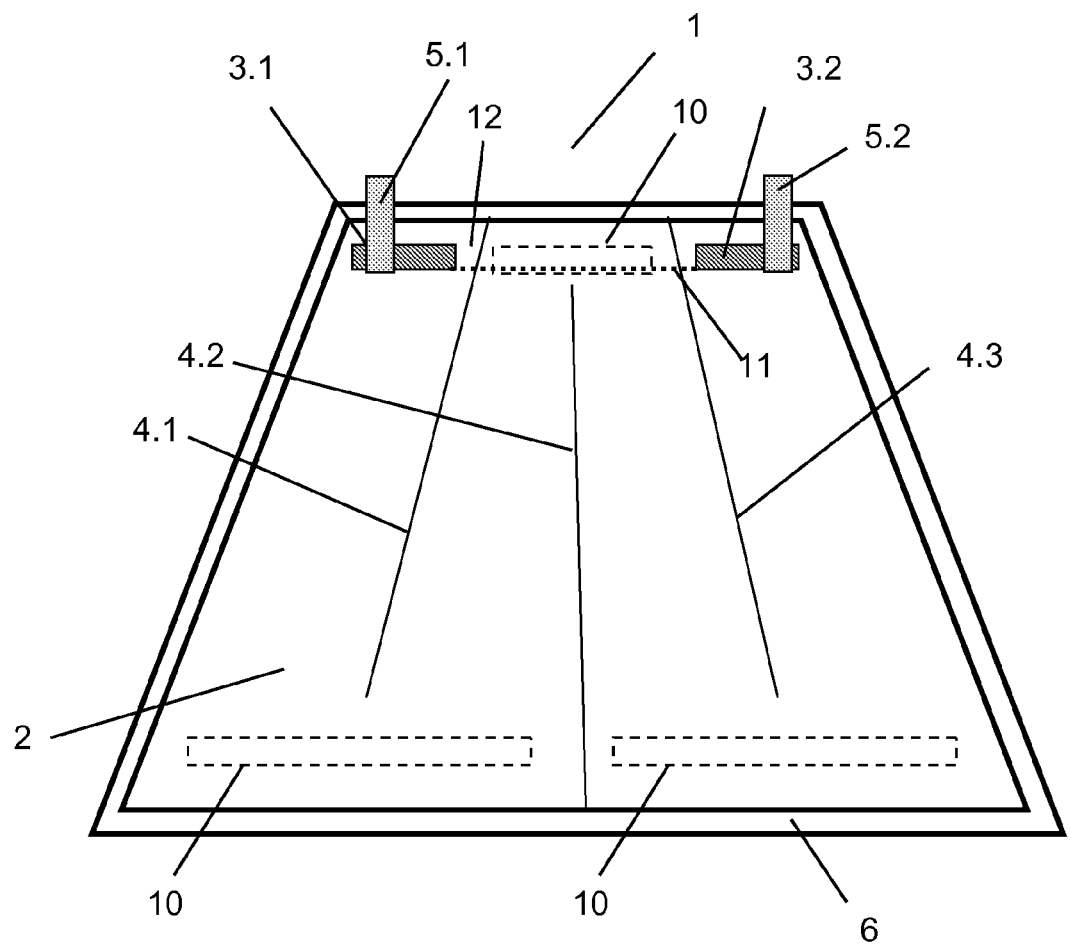
Figure 6:
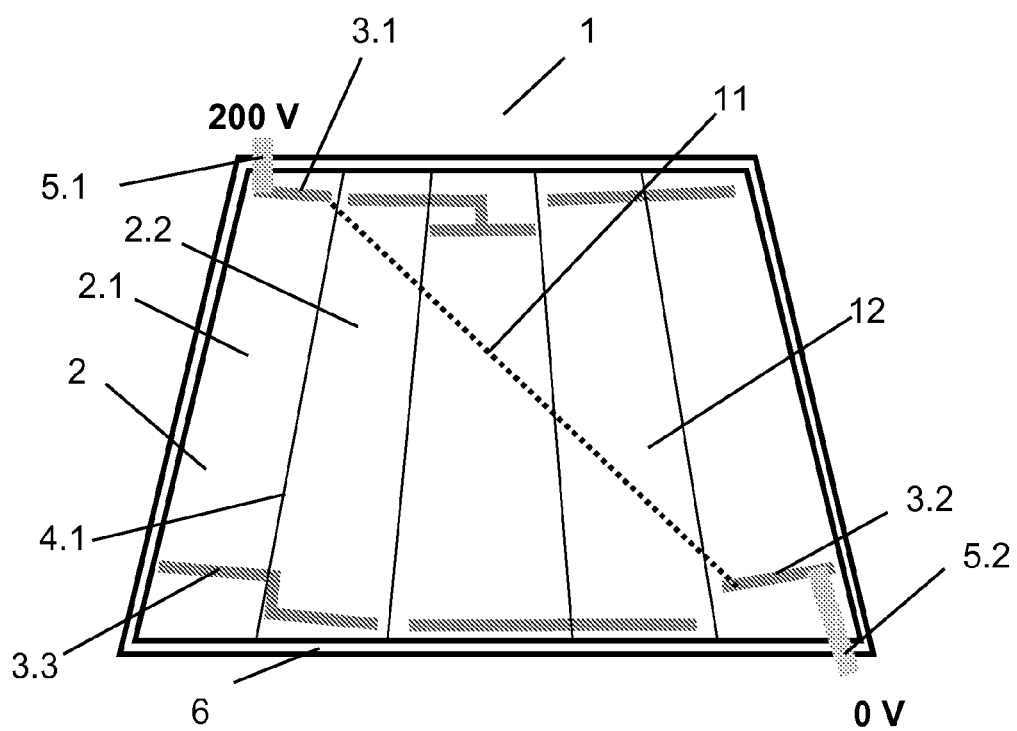

The invention is now explained in detail with reference to exemplary embodiments, referring to the accompanying figures. They depict, in simplified representation, not to scale:

FIG. 1 a composite pane 1 implemented according to the invention in a motor vehicle windshield in a plan view of the inner pane 1.2 of the composite pane 1;

FIG. 2 a cross-sectional drawing along the line A-A' of FIG. 1 through a composite pane 1 implemented according to the invention;

FIG. 3 a cross-sectional drawing along the line B-B' of FIG. 1 through a composite pane 1 implemented according to the invention with an incision 4.1 in the transparent, electrically conductive coating 2, FIG. 4 a cross-sectional drawing along the line C-C' of FIG. 1 through a composite pane 1 implemented according to the invention with an incision 4.1 in the transparent, electrically conductive coating 2 in the region of a bus bar 3.3;

FIG. 5 a plan view of an alternative embodiment of the composite pane 1 implemented according to the invention; and FIG. 6 a plan view of another alternative embodiment of the composite pane 1 implemented according to the invention.

The figures depict an embodiment of the composite pane according to the invention with an electrically heatable coating, designated as a whole with the reference character 1. FIG. 1 depicts a composite pane 1 implemented according to the invention in the form of a motor vehicle windshield in a plan view of the outer side IV of an inner pane 1.2. FIG. 2 depicts a cross-sectional drawing along the line A-A' of FIG. 1.

The individual panes 1.1 and 1.2 of the composite pane 1 are made of float glass and and have, in each case, thicknesses of 2.1 mm. The individual panes are bonded to one another with a thermoplastic intermediate layer. The thermoplastic intermediate layer is made of a polyvinyl butyral (PVB) film 7 with a thickness of 0.76 mm. In the example depicted, a transparent, electrically conductive coating 2 is applied on the side III of the inner pane 1.2 facing the thermoplastic intermediate layer 7. The electrically heatable coating can, however, be applied on the side II of the outer pane 1.1 facing the thermoplastic intermediate layer, or on both pane inner sides II and III. The Roman numeral I designates the outer side of the outer pane 1.1; II, the inner side of the outer pane 1.1; III, the inner side of the inner pane 1.2; and IV, the outer side of the inner pane 1.2.

The transparent, electrically heatable coating 2 is known, for example, from EP 0 847 965 B1 and consists of two silver layers, which are, in each case, embedded between a plurality of metal and metal oxide layers. The exact layer sequence is presented in Table 1.

TABLE 1

| Material Glass | Layer thickness [nm] |
|---|---|
| $Si_3N_4$ | 9 |
| ZnO | 21 |
| Ti | 1 |
| Ag | 9 |
| Ti | 1 |
| ZnO | 16 |

TABLE 1-continued

| Material Glass | Layer thickness [nm] |
|---|---|
| Si$_3$N$_4$ | 57 |
| ZnO | 16 |
| Ti | 1 |
| Ag | 10 |
| Ti | 1 |
| ZnO | 20 |
| Si$_3$N$_4$ | 18 |
| PVB | |

The layer system has a sheet resistance of roughly 3 ohm/square to 5 ohm/square.

The transparent, electrically conductive coating 2 extends over the entire surface area of the side III of the pane 1.2, minus a circumferential frame-like decoated region with a width b of 8 mm. The width of the region covered by the masking print 8 is referenced by the letter b. This serves for electrical insulation between the voltage-carrying coating and the motor vehicle body. The decoated region is hermetically sealed by gluing with the intermediate layer 7.

A plurality of bus bars 3.1, 3.2, 3.3, 3.4, and 3.5 are situated on the outer edge of the pane. The bus bars 3.1, 3.2, 3.3, 3.4, and 3.5 were printed on the transparent, electrically conductive coating 2 using a conductive silver paste and baked in. The bus bars 3.1, 3.2, 3.3, 3.4, and 3.5 are electrically conductingly connected to the regions of the coating 2 located under them. A first bus bar 3.1 is electrically connected to a first feed line 5.1. A second bus bar 3.2 is electrically connected to a second feed line 5.2. The feed lines 5.1 and 5.2 are made of tinned copper foil with a width of 10 mm and a thickness of 0.3 mm. The first feed line 5.1 is soldered to the first bus bar 3.1; and the second feed line 5.2, to the second bus bar 5.2. The other bus bars 3.3 to 3.5 are not connected to a feed line. The two feed lines 5.1., 5.2 are provided for connecting to the two poles of a voltage source for supplying the operating voltage.

On the outer pane 1.1, an opaque color coating with a width a of 20 mm is applied like a frame on the edge of the inner side II as a masking print 8. The masking print 8 conceals the view of the strand of adhesive, with which the composite pane is bonded into the vehicle body. At the same time, the masking print 8 serves as protection of the adhesive against UV radiation and thus as protection against premature aging of the adhesive. Moreover, the bus bars 3.1, 3.2, 3.3, 3.4, and 3.5 and the feed lines 5.1, 5.2 are covered by the masking print 8. The width of the region covered by the masking print 8 is referenced with the letter a.

FIG. 3 depicts a cross-sectional drawing along the line B-B' of FIG. 1. The transparent, electrically conductive coating 2 has a first incision 4.1 and is (electrically) divided into two coating regions 2.1 and 2.2 completely separated from one another. Two further incisions 4.2, 4.3 divide the transparent, electrically conductive coating 2 into a total of four coating regions 2.1, 2.2, 2.3, 2.4 completely isolated from one another electrically. The incisions 4.1, 4.2, and 4.3 were introduced into the coating 2 with a focused laser beam.

FIG. 4 depicts the connection, by a third bus bar 3.3 without a feed line, of the coating regions 2.1 and 2.2 electrically isolated from one another. A fourth bus bar 3.4 without a feed line electrically connects the adjacent coating regions 2.2 and 2.3 to one another, and the fifth bus bar 3.5 without a feed line electrically connects the adjacent coating regions 2.3 and 2.4 to one another. The different coating regions 2.1-2.4 are thus electrically connected in series.

When an operating voltage is applied via the two feed lines 5.1, 5.2 to the first bus bar 3.1 or second bus bar 3.2, a current flows through the transparent, electrical coating 2. The path of the electric current is lengthened by the incisions 4.1, 4.2, 4.3 and passes through the regions 2.1, 2.2, 2.3, 2.4 of the coating 2 in succession.

FIG. 5 depicts a plan view of an alternative embodiment of the composite pane 1 implemented according to the invention. In contrast to the variant of FIG. 1, in this embodiment, the transparent, electrically conductive coating 2 is not separated by the incisions 4.1, 4.2, 4.3 into coating regions electrically isolated from one another. Nevertheless, the path of the electrical current is lengthened and the resistance of the coating 2 between the two feed lines 5.1, 5.2 is increased. In this arrangement, two bus bars 2.1 and 2.2, which are situated at an upper edge 9.3 of the composite pane 1, are needed.

In addition, additional bus bars can be applied in the regions 10 of the transparent, electrically conductive coating 2, in which the direction of the current is reversed. The additional bus bars result in a more uniform distribution of potential and thus in a more homogeneous heating output as well as a more homogeneous temperature distribution.

FIG. 6 depicts a plan view of another alternative embodiment of the composite pane 1 implemented according to the invention. The transparent, electrically conductive coating 2 has a sheet resistance of 4 ohm/square. Because of the incisions 4.1, 4.2, 4.3, and 4.4, the coating 2 has a total resistance of roughly 64 ohm. After application of an operating voltage of 200 V, the switch-on power was roughly 621 W and the switch-on current was roughly 3.1 A. After a period of 30 min., a thermographic image of the composite pane 1 was created. The maximum temperature in the central field of vision was roughly 71° C.

FIGS. 1, 5, and 6 schematically represent, with the reference number 11, in each case, a shortest geometric distance between the first bus bar 3.1 and the second bus bar 3.2, which are, in each case, connected to a feed line and have a greatest difference in potential among the bus bars. In each embodiment of the composite pane according to the invention, the coating section 12 of the coating 2, which is situated in the region of the shortest geometric distance 11 between the first bus bar 3.1 and the second bus bar 3.2, is electrically interrupted by a plurality of incisions. In FIG. 1, the coating 2 is interrupted by three incisions 4.1, 4.2, 4.3 in a direct line between the two bus bars 3.1, 3.2. In FIG. 5, the coating 2 is interrupted by two incisions 4.1, 4.2 in a direct line between the two of bus bars 3.1, 3.2. In FIG. 6, the coating 2 is interrupted by four incisions 4.1-4.4 in a direct line between the two bus bars 3.1, 3.2. The number of incisions is, in each case, selected depending on the magnitude of the operating voltage provided such that a voltage drop over an individual incision by which two adjacent coating regions are electrically separated from one another is less than a breakdown voltage of the incision. By means of this measure, the incisions can, particularly advantageously, be implemented very narrow such that the optically aesthetic appearance of the composite pane is not impaired.

LIST OF REFERENCE SIGNS 1 composite pane
1.1 outer pane
1.2 inner pane
2 coating 2.1 first coating region
2.2 second coating region
2.3 third coating region
2.4 fourth coating region
3.1 first bus bar with feed line
3.2 second bus bar with feed line
3.3 first bus bar without feed line
3.4 second bus bar without feed line
3.5 third bus bar without feed line
4.1 first incision
4.2 second incision
4.3 third incision
4.4 fourth incision
5.1 first feed line
5.2 second feed line
6 decoated edge
7 intermediate layer
8 masking print
9.1 first vertical edge
9.3 first horizontal edge
9.4 second horizontal edge
10 region for additional bus bars
11 shortest geometric distance
12 coating section

The invention claimed is:

1. A composite pane with an electrically heatable coating, comprising:
   at least two individual panes,
   an intermediate layer, which bonds the at least two individual panes to one another,
   at least one transparent, electrically conductive coating on at least one side of at least one of the at least two individual panes facing the intermediate layer, and
   at least two bus bars, the at least two bus bars being connected to the at least one transparent, electrically conductive coating, wherein a first bus bar is electrically connected to a first feed line provided for connection to one pole of a voltage source and a second bus bar is electrically connected to a second feed line provided for connection to a second pole of the voltage source,
   wherein the at least one transparent, electrically conductive coating
   contains silver,
   has a sheet resistance of 1 ohm/square to 10 ohm/square, and
   has n linear incisions, where n is an integer>2, wherein each of said n linear incisions has a width in a range of from 10 μm to 500 μm, the n linear incisions dividing the at least one transparent, electrically conductive coating into a plurality of coating regions, with each of said n linear incisions extending from one edge to an opposite edge of the electrically conductive coating, wherein the coating regions of the plurality of coating regions adjacent to each other are completely electrically isolated from one another electrically by a respective incision and are electrically connected to one another in series by a bus bar without a feed line, and wherein the n linear incisions are implemented such that a resistance of the at least one transparent, electrically conductive coating results in a heating output from 300 W/m² to 1000 W/m² with an operating voltage in a range of 100 V to 400 V- and wherein a coating section of the at least one transparent, electrically conductive coating situated in a region of a shortest geometric distance between the first bus bar and the second bus bar is electrically interrupted by a plurality of said n linear incisions, wherein a number of said n linear incisions is selected depending on a magnitude of the operating voltage, such that a voltage drop over an individual incision of said n linear incisions, by which two adjacent coating regions of the plurality of coating regions are electrically separated from one another, is less than a breakdown voltage of an incision of said n linear incisions.

2. The composite pane according to claim 1, wherein the coating regions of the plurality of coating regions adjacent to each other are electrically isolated from one another in sections by a respective incision, but are implemented in a connected manner.

3. The composite pane according to claim 1, wherein the width of each of the n linear incisions is such that the operating voltage provided is greater than the electrical breakdown voltage of said each incisions.

4. The composite pane according to claim 1, wherein the at least two individual panes contain glass, or polymers.

5. The composite pane according to claim 1, wherein the at least one transparent, electrically conductive coating has a sheet resistance in a range from; 3 ohm/square to 5 ohm/square.

6. The composite pane according to claim 1, wherein the at least one transparent, electrically conductive coating extends over at least 90% of a surface area of one side of the at least two individual panes.

7. The composite pane according to claim 1, wherein the n linear incisions are introduced into the at least one electrically conductive coating by laser structuring, mechanical ablation, or by chemical or physical etching.

8. The composite pane according to claim 1, wherein the bus bars are disposed on edges of the composite pane that are vertical in an installed position.

9. The composite pane according to claim 1, wherein the first bus bar and the second bus bar are respectively disposed on an edge of one side of the composite pane.

10. A method comprising:
    using the composite pane according to claim 1 in means of transportation for travel on land, in air, or on water.

11. A method comprising:
    using the composite pane according to claim 1 as a motor vehicle pane in means of transportation with an on-board voltage in a range from more than 100 V to 400 V.

12. A method comprising:
    using the composite pane according to claim 1 as a motor vehicle pane in motor vehicles that are driven by conversion of electrical energy.

13. A method comprising:
    using the composite pane according to claim 1 as a motor vehicle pane in hybrid electric vehicles that are driven by conversion of another energy form in addition to conversion of electrical energy.

14. The composite pane according to claim 4, wherein the glass contained in the at least two individual panes comprises flat glass, float glass, quartz glass, borosilicate glass or soda-lime glass.

15. The composite pane according to claim 4, wherein the polymers contained in the at least two individual panes comprise polyethylene, polypropylene, polycarbonate, polymethyl methacrylate, or mixtures thereof.

16. The method according to claim 10, wherein the composite pane is used as a windshield, rear window, side window, or glass roof in means for transportation.

17. The method according to claim 10, wherein the means for transportation is a motor vehicle.

18. The method according to claim 12, wherein the conversion of electrical energy within the motor vehicles driven by conversion of electrical energy comprises: accumulators, rechargeable batteries, fuel cells, or internal combustion engine driven generators.

19. The method according to claim 12, wherein the motor vehicle driven by conversion of electrical energy is an electric vehicle.

20. A composite pane with an electrically heatable coating comprising:
- at least two individual panes,
- an intermediate layer, which bonds the at least two individual panes to one another,
- at least one transparent, electrically conductive coating on at least one side of at least one of the at least two individual panes facing the intermediate layer, and
- at least two bus bars, the at least two bus bars being connected to the at least one transparent, electrically conductive coating, wherein a first bus bar is electrically connected to a first feed line provided for connection to one pole of a voltage source and a second bus bar is electrically connected to a second feed line provided for connection to a second pole of the voltage source, wherein the at least one transparent, electrically conductive coating contains silver, has a sheet resistance of 1 ohm/square to 10 ohm/square, and has n linear incisions, where n is an integer≥2, wherein each of said n linear incisions has a width in a range of from 10 μm to 500 μm, the n linear incisions dividing the at least one transparent, electrically conductive coating into a plurality of coating regions, with each of said n linear incisions extending from one edge towards an opposite edge of the electrically conductive coating without reaching the opposite edge of the electrically conductive coating, wherein the coating regions of the plurality of coating regions are electrically connected to one another in series, wherein the coating regions of the plurality of coating regions adjacent to each other are electrically isolated from one another in sections by a respective incision but are implemented in a connected manner such that the current flows meanderingly through the coating, and wherein the n linear incisions are implemented such that a resistance of the at least one transparent, electrically conductive coating results in a heating output of from 300 W/m2 to 1000 W/m2 with an operating voltage in a range of from more than 100 V to 400 V, in particular, in a range of from 280 V to 400 V, and wherein a coating section of the at least one transparent, electrically conductive coating situated in a region of a shortest geometric distance between the first bus bar and the second bus bar is electrically interrupted by a plurality of said n linear incisions, wherein a number of said n linear incisions is selected depending on a magnitude of the operating voltage such that a voltage drop over an individual incision of said n linear incisions by which two adjacent coating regions of the plurality of coating regions are electrically separated from one another, is less than a breakdown voltage of an incision of said n linear incisions.

\* \* \* \* \*